Nov. 4, 1969   G. KUNSTLE ET AL   3,476,798
PROCESS FOR SEPARATING AZEOTROPIC MIXTURES FROM ESTERS
OF ALIPHATIC SATURATED OR UNSATURATED CARBOXYLIC
ACIDS AND ALCOHOLS BY AZEOTROPIC DISTILLATION
WITH A HYDROCARBON HALIDE
Filed Jan. 25, 1968
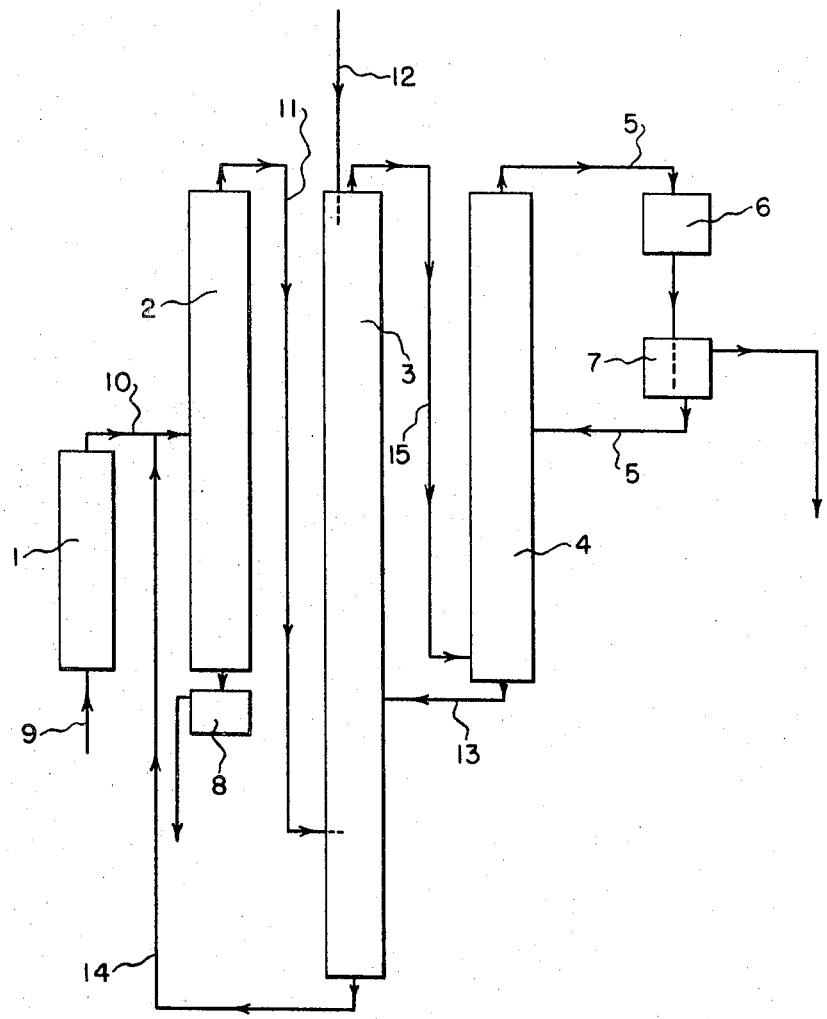
INVENTORS
GERHARD KUNSTLE
HERBERT SIEGL
BY
*D. Malcolm*
ATTORNEY

United States Patent Office 3,476,798
Patented Nov. 4, 1969

3,476,798
PROCESS FOR SEPARATING AZEOTROPIC MIXTURES FROM ESTERS OF ALIPHATIC SATURATED OR UNSATURATED CARBOXYLIC ACIDS AND ALCOHOLS BY AZEOTROPIC DISTILLATION WITH A HYDROCARBON HALIDE
Gerhard Kunstle and Herbert Siegl, Burghausen, Upper Bavaria, Germany, assignors to Wacker-Chemie G.m.b.H., Munich, Bavaria, Germany, a corporation of Germany
Continuation-in-part of application Ser. No. 364,901, May 5, 1964. This application Jan. 25, 1968, Ser. No. 700,366
Claims priority, application Germany, May 9, 1963, W 34,453
Int. Cl. C07c 69/52, 69/34, 29/28
U.S. Cl. 260—486                                    9 Claims

ABSTRACT OF THE DISCLOSURE

This invention provides a novel and improved process for separating azeotropic mixtures from esters of aliphatic saturated or unsaturated carboxylic acids and alcohols. It accomplishes this by subjecting the ester-alcohol mixture, especially an azeotropic mixture with a high alcohol content, to treatment with a hydrocarbon halide which forms with said alcohol an azeotropic mixture whose boiling point is well below the boiling point of said azeotropic ester-alcohol mixture, so that the newly formed azeotropic mixture may be readily separated from the ester by distillation, and, after separation, may be readily divided by water extraction into its component parts.

CROSS-REFERENCE TO RELATED APPLICATION

This application is a continuation-in-part of application Ser. No. 364,901, filed May 5, 1964, and now abandoned.

BACKGROUND OF THE INVENTION

In technical chemical processes one frequently obtains ester-alcohol mixtures which constitute an obstacle to the further reaction process and whose separation causes technical difficulties especially when the ester-alcohol mixture is an azeotropic mixture with high alcohol content.

It is known that one can separate these azeotropic mixtures by extraction as well as by distillation. The separation by distillation is done in the presence of a liquid which aids distillation and which together with the alcohol forms an azeotropic mixture which is separated from the ester by distilling and divided into its two components. As the liquid for aiding the distillation one uses, among others, aliphatic hydrocarbons or petroleum fractions.

However, the use of hydrocarbons entails disadvantages because during the separation of the hetero-azeotropic hydrocarbon-alcohol mixture no ester-free alcohol phases are obtained.

SUMMARY OF THE INVENTION

We have now discovered a process for the continuous or discontinuous separation of azeotropic mixtures from esters of aliphatic saturated or unsaturated carboxylic acids and the alcohols corresponding to the alcohol component of the ester by azeotropic distillation, in a given case during or after reactions where these mixtures are created or are present. One removes the alcohol from the ester continuously by the addition of suitable hydrocarbon halides which form with this alcohol an azeotropic mixture whose boiling point is at least 5° C., but not more than 40° C. below the boiling point of the azeotropic ester-alcohol mixture, and this azeotropic hydrocarbon halide-alcohol mixture is separated from the ester by distilling; then one separates the last-mentioned mixture after addition of water, into an aqueous alcohol and hydrocarbon halide phase; and the said hydrocarbon halide phase, after removal of the aqueous alcohol phase, is circulated in such a manner that for the formation of more azeotrope the theoretically necessary, originally applied quantity of hydrocarbon halide is again available.

Therefore for the quantitative separation of the alcohol a single addition of hydrocarbon halide at the start of operations is sufficient, determined by the size and capacity of the available apparatus and the physical properties of the hydrocarbon halide used.

During the phase separation of the azeotropic hydrocarbon halide-alcohol mixture water is added to the extent that a pure aqueous alcohol phase as well as a pure hydrocarbon halide phase is obtained, respectively. The required quantity of water may vary within wide limits and at a given temperature it is determined by the physical properties of the alcohol and the hydrocarbon halide.

According to the invention, all azeotropic ester-alcohol mixtures can be separated whose alcohol is without any limit or well mixable with water, for instance methanol, ethanol, n-propanol or isopropanol.

DESCRIPTION OF THE PREFERRED EMBODIMENTS

Suitable as hydrocarbon halides are aliphatic saturated or unsaturated compounds with 1–4 carbon atoms, which for instance have 1–4 halogen atoms on one or several different carbon atoms of the molecule, where at least 2 halogen atoms may be identical or different, preferably fluorine, chlorine or bromine as well as the stereo-isomer hydrocarbon halides in cis- or trans-position resulting therefrom. There may be mentioned as examples: carbon tetrachloride, 2-butane chloride, 2-propane bromide, trans-1.2-dichloroethylene, dichlormethane, trichlormethane, 2-propane chloride, 1-propane chloride, 1-propane bromide, 2.2-propane dichloride, 3-propene chloride, 3-propene bromide, 1.2-dichlor-1-propene, 1.1.1-trichlorethane or cis-1.2-dichlorethylene, and 2-propene bromide.

The hydrocarbon halide can be added directly to the azeotropic ester-alcohol mixture, which is most suitably done in the subsequent distilling column. During addition while a chemical process is going on, e.g. transesterification or hydrolysis, the point of addition may vary, i.e. it may be located at a point which is more or less distant from the reaction chamber. The point of introduction depends on the physical and chemical properties of the hydrocarbon halide.

The process is applied with particular advantage during discontinuous and continuous transesterifications or hydrolyses where azeotropic ester-alcohol mixtures are formed. In that case it is useful to add the hydrocarbon halides during the transformation.

Moreover it is sufficient for the quantitative process when the esters are applied during transesterification in equimolar quantities or in a slight excess which is considerably below the otherwise necessary theoretical quantities.

By means of this process it is possible to keep the obtained aqueous alcohol phase very pure, so that an ester reclaiming process becomes unnecessary.

Moreover, during the distillative separation of the azeotropic hydrocarbon halide-alcohol mixtures the quantities of ester removed are smaller than during the distillative separation of a hetero-azeotropic hydrocarbon-alcohol mixture, for instance.

It is also remarkable that during esterifications or hydrolyses low-boiling hydrocarbon halides may also be used without impairing the reaction time.

Finally, it was surprisingly found that the stabilizing effect of known non-volatile or hardly volatile stabilizers for easily polymerizable esters is supplemented and considerably increased by hydrocarbon halides. For instance, the transesterification of acrylic acid methyl ester with higher alcohols in the presence of a catalyst, e.g. p-toluol sulfonic acid, and of a stabilizer, e.g. phenothiazine and of a hydrocarbon halide, e.g. trans-1,2-dichlorethylene results in very pure monomeric higher acrylic esters, with good yield and avoiding any polymerizations.

The accompanying drawing is a diagrammatic illustration of a system of apparatus suitable for carrying out the process of the invention and is hereinafter described in connection with Example 9.

Example 1

The apparatus consists of a round flask with a capacity of 2 liters equipped with a stirring device, a Raschig ring column 140 cm. high and having 40 mm. diameter, a mixing vessel equipped with a vibro-mixer and a phase separator for the continuous removal of the top layer. The column is filled with glass Raschig rings of 6 mm. diameter.

In order to separate the forming acrylic butyl ester from the residue, the remaining contents of the flask, after completion of the esterification, is distilled through a Vigreux column 60 cm. high with a diameter of 25 mm.

An initial filling is placed in the flask, consisting of 444 g. (6 mol) butanol, 532 g. (6 mol) acrylic acid methyl ester (97% pure), 23.3 g. p-toluol-sulfonic acid and 3 g. phenothiazine. While being stirred it is heated to boil and trans-1.2-dichlorethylene is continuously added from a circulating trans-1.2-dichlorethylene in the center of the column. Methanol is withdrawn at the rate of its release during the transesterification at the head of the column in the form of the azeotropic trans-1.2-dichlorethylene-methanol mixture with 10.1% methanol which boils at 42.5° C. (760 Hg column), mixed continuously with water in the mixing vessel and separated into two layers in the phase separator. The upper 49.9% aqueous methanol layer is withdrawn and processed by distilling. The lower trans-1.2-dichlorethylene layer runs continuously back into the middle of the column. To remove 1 mol methanol 2.94 mols of trans-1.2-dichlorethylene are circulated.

After completion of the transesterification the contents of the flask are fractionated first at normal pressure and then at 40 mm. Hg column through the Vigreux column.

At a 90.2% transformation of the acrylic acid methyl ester and a 91.3% transformation of the butanol the yield of acrylic acid butyl ester (100%) is 667 g., that is 96.2% with relation to the consumed acrylic acid methyl ester (100%). No polymer formations occur. The consumption of catalyst is 3.5%, the consumption of stabilizer 0.45% as related to the pure acrylic acid butyl ester produced. During the phase separation of the azeotropic trans-1.2-dichlorethylene-methanol mixture the total yield is 334 g. 49.9% aqueous methanol, that is a total of 166.5 g. 100% methanol or 96.2% of theory and the originally applied trans-1.2-dichlorethylene.

Example 2

The apparatus described in Example 1 is used, and as stated there the work is done and the initial filling placed in the flask. Furthermore, the acrylic acid butyl ester obtained as the main fraction is removed at a boiling range of 60–65° C. All intermediary runs and the bubble residue are placed with the next charge. The following are placed in a total of nine starts: 4644 g. (54 mol) acrylic acid methyl ester (100%), 3996 g. (54 mol) butanol, 58.3 g. p-toluol sulfonic acid and 29.3 g. phenothiazine. During a 94.5% transformation of the acrylic acid methyl ester and 94.2% transformation of the butanol the yield of acrylic acid butyl ester (100%) is 6315 g., that is 96.8% as related to the consumed acrylic acid methyl ester. There is no polymer formation. The consumption of catalyst is 0.93%, the consumption of stabilizer 0.46% as related to the pure acrylic acid butyl ester produced. During the phase separation of the azeotropic trans-1.2-dichlorethylene-methanol mixture the total yield is 3240 g. 49.9% aqueous methanol, that is 1617 g. 100% methanol or 99.2% of theory, and the originally applied trans-1.2-dichlorethylene.

Example 3

The apparatus as described in Example 1 is used and the same procedure is followed.

The starting filling or charge consists of a mixture of 222 g. (3 mol) butanol, 399 g. (4.5 mol) acrylic acid methyl ester (97%), 37.3 g. p-toluol sulfonic acid and 18.6 g. phenothiazine.

The filling for the subsequent nine starts consists, besides the intermediate runs and residues from the preceding starts, of a total of 1998 g. (27 mol) butanol, 2451 g. (28.5 mol) acrylic acid methyl ester (100%), 37.3 g. p-toluol sulfonic acid and 18.6 g. phenothiazine.

At a 90.2% transformation of the acrylic acid methyl ester and a 95.7% transformation of the butanol the yield of acrylic acid butyl ester (100%) is 3232 g., that is 98.6% as related to the acrylic acid methyl ester consumed. There is no polymer formation. The consumption of catalyst is 1.15%, the consumption of stabilizer 0.57% as related to the pure acrylic acid butyl ester produced. During the phase separation of the azeotropic trans-1.2-dichlorethylene-methanol mixture the total yield is 1474 g. of 55.7% aqueous methanol, that is 821 g. of 100% methanol or 99.8% of theory.

Example 4

The apparatus described in Example 1 is used and the same procedure as described therein is followed.

The initial charge is a mixture of 222 g. (3 mol) butanol, 455 g. (4.5 mol) methacrylic acid methyl ester ,99%), 34 g. p-toluol sulfonic acid, and 17 g. phenothiazine.

The charges for the total nine starts consists, beside the intermediate runs and the residues of the above starts, of a total of 1998 g. (27 mol) butanol, 2850 g. (28.5 mol) methacrylic acid methyl ester (100%), 34 g. p-toluol sulfonic acid and 17 g. phenothiazine.

The contents in the flask left after termination of the transesterification is fractionated each time first at normal pressure, then under gradual increase of the vacuum at 11 mm. Hg column through the Vigreux column. Only the methacrylic acid butyl ester with a boiling range of 50–52° C. (50 mm. Hg) obtained as the main fraction is removed.

At a 91.8% transformation of the methacrylic acid methyl ester and a 96.3% transformation of the butanol, the yield of methacrylic acid butyl ester (100%) is 3680 g., that is 99.1% related to the methacrylic acid methyl ester consumed. There is no polymer formation.

During the phase separation of the azeotropic trans-1.2-dichlorethylene-methanol mixture the total yield is 1606 g. 52% aqueous methanol, i.e. 835 g. 100% methanol or 99.7% of theory.

Example 5

The apparatus as described in Example 1 is used and the same procedure as described in Example 1 is followed.

The initial charge consists of a mixture of 390 g. (3 mol) 2-ethyl hexanol, 399 g. (4.5 mol) acrylic acid methyl ester (97%), 47.3 g. p-toluol sulfonic acid and 23.7 g. phenothiazine.

After completion of the transesterification the contents of the flask is fractionated through the Vigreux column, first under normal pressure, then by slowly increasing the vacuum, at 8 mm. Hg column. Removed is only acrylic acid-2-ethylhexyl ester with a boiling range of 90–92° C.

(8 mm. Hg column) which is obtained as the main fraction. All intermediate runs as well as the bubble residue are placed with the next charge which consists of 390 g. (3 mol) 2-ethyl hexanol and 266 g. (3 mol) acrylic acid methyl ester (97%). A total of 9 runs are made and 3510 g. (27 mol) 2-ethyl hexanol, 2451 g. (28.5 mol) acrylic acid methyl ester (100%), 47.3 g. p-toluol sulfonic acid and 23.7 g. phenothiazine are filled in.

At a 92.3% transformation of the acrylic acid methyl ester and a 96.2% transformation of the 2-ethyl hexanol the yield of acrylic acid-2-ethyl hexyl ester (100%) is 4671 g., that is 96.5% computed on the basis of consumed acrylic acid methyl ester and 97.7% as related to the consumed 2-ethyl hexanol.

During the phase separation of the azeotropic trans-1.2-dichlorethylene-methanol mixture the total yield is 1428 g. 58.4% aqueous methanol, that is 840 g. of 100% methanol or 99.7% of the theoretically possible quantity of methanol.

Example 6

In a 2 liter flask which is equipped with a column 210 cm. high and of 40 mm. diameter filled with glass Raschig rings of 6 mm. diameter, one places 1000 g. of azeotropic mixture consisting of 366 g. (11.4 mol) methanol and 634 g. (7.37 mol) vinyl acetate, heated on recirculation. At the same time 1-propane chloride is continuously fed into the lower third of the column from a 1-propane chloride circulation in such a manner that above the head of the column an azeotropic mixture boiling at 40.6° C. (760 mm. Hg column) of methanol and 1-propane chloride with 10.0% methanol is obtained. The azeotropic 1-propane chloride-methanol mixture is mixed in the mixing vessel as described in Example 1 continuously with water and separated into 2 layers in the phase separator. The upper aqueous 42.3% methanol layer obtained is withdrawn continuously and processed by distilling, the lower 1-propane chloride layer runs off continuously back into the lower third of the column. In order to separate 1 mol methanol, 3.67 mols 1-propane chloride are circulated. One obtains thereby 863 g. of 42.3% aqueous methanol or 365 g. 100% methanol, or 99.7% of the charge.

The distillation of the bubble residue results, after a first run of 1-propane chloride, in almost quantitative yield, in pure methanol-free vinyl acetate.

Example 7

The apparatus as described in Example 6 is used and the same procedure is followed as stated in Example 6.

The bubble charge consists of 500 g. of an azeotropic propionic acid methyl ester-methanol mixture with 237.5 g. (7.42 mol) methanol and 262.5 g. (2.98 mol) propionic acid methyl ester. As distilling agent one uses 2-propane bromide which is rotated as described in Example 1. Through the head of the column one obtains an azeotropic mixture of methanol and 2-propane bromide with 14.5% methanol that boils at 49.0° C. (760 mm. Hg column). In order to separate 1 mol methanol 1.53 mol of 2-propane bromide are circulated. During the phase separation of the azeotropic 2-propane bromide-methanol mixture the total yield is 484.5 g. aqueous 48.9% methanol, that is 237 g. methanol 100% or 99.8% of the charge. Distillation of the bubble residue results, besides a first run of 2-propane bromide, in almost quantitative yield, in pure methanol-free propionic acid methyl ester.

Example 8

The apparatus as described in Example 6 is used and the same procedure is followed.

The bubble filling consists of 500 g. of an azeotropic ethyl acetate-ethanol mixture with 155 g. (3.4 mol) ethanol and 345 g. (3.9 mol) ethyl acetate. As distilling agent one uses 1.1.1-trichlorethane which is rotated as described in Example 1. Through the head of the column one obtains an azeotropic mixture of ethanol and 1.1.1-trichlorethane with 16.2% ethanol which boils at 64° C. (727 mm. Hg column). In order to separate 1 mol ethanol 1.79 mol of 1.1.1-trichlorethane are circulated. During the phase separation of the azeotropic 1.1.1-trichlorethane-ethanol mixture one obtains a total of 541.5 g. of aqueous 34.2% ethanol which is 154.2 g. of 100% ethanol or 99.7% of the filling. Distilling of the bubble residue, after a first run of 1.1.1-trichlorethane, results in pure ethanol-free ethyl acetate.

Example 9

The apparatus used, and illustrated in the accompanying drawing, consists of a first column 1 which is 100 cm. high and has a diameter of 65 mm., a separator column 2 which is 200 cm. high and has a diameter of 50 mm., a 400 cm. high heatable main column 3 with 50 mm. diameter, containing the cation exchanger known under the commercial brand name Amberlite IR120, and a 300 cm. high after-column 4 with a diameter of 50 mm. While the advance column 1 contains a cation exchanger which is known under the trade name of Lewatit S100 in the form of a solid bed filling, the cation exchanger in the main column 3 is arranged on sieve floors in such a way that gaseous products can pass upward without any difficulty while liquid reaction partners must pass the cation exchanger layers. The separator column 2 and the after-column 4 are filled with glass Raschig rings with diameters of 6 and 4 mm., respectively.

941 g. of a mixture consisting of 180 g. (10 mol) water, 740 g. (10 mol) methyl acetate and 21 g. (0.65 mol) methanol are piped into the first column 1 through conduit 9 from below upward at 50° C. every hour. The presaponification mixture obtained at the upper end of column 1 is piped through tube 10 to the middle of the separator column 2, and at the head a methyl acetate-methanol mixture almost free of acetic acid is obtained which is piped in vapor form through pipe 11 into the lower third of the main column 3. Furthermore the main column 3 is fed through pipe 12 above the cation exchanger filling every hour with 828 g. (46 mol) water in the middle through pipe 13 with the runoff of after-column 4. The runoff of the main column 3 is returned through pipe 14 into the middle of separator column 2. The sump 8 of separator column 2 is kept at about 100° C. The main column 3 is heated above the boiling point of the methanol. The head product of main column 3 is piped through pipe 15 into the lower third of the after-column 4 in vapor form. Dichlormethane is continuously fed into the upper half of the after-column 4, into the methyl acetate-methanol mixture, from the circulating dichlormethane pipe 5. The temperature in the after-column 4 is regulated by heating the lower third in such a manner that below one obtains methanol-containing methyl acetate and at the head every hour an average of 4671 g. of an azeotropic dichlormethane-methanol mixture with 7.3% methanol which boils at 37.8° C. (760 mm. Hg column). The mixture is mixed hourly as described in Example 1 in the mixing vessel 6 with 372 g. water and separated into 2 layers in the phase separator 7. The average yield per hour is 713 g. of a 47.8% aqueous methanol which is removed and 4330 g. dichlormethane which is fed again into the upper half of the after-column 4. The runoff from sump 8 of separator column 2 yields an average of 1608 g. of 37.3% aqueous acetic acid per hour.

Example 10

This example relates to the use of a hydrocarbon halide which is aliphatic and unsaturated, and contains 1–4 carbon atoms and various halogen atoms in the trans-position on different C atoms. The compound in this case is 1-bromo-2-chlorethylene. The apparatus as described in Example 6 is used and the same procedure is followed.

The bubble filling consists of 500 g. of an azeotropic ethyl acetate-ethanol mixture with 155 g. (3.4 mol) ethanol and 345 g. (3.9 mol) ethyl acetate. As distilling agent one uses trans-1-bromo-2-chlorethylene which is rotated as described in Example 1. Through the head of the column one obtains an azeotropic mixture of ethanol and trans-1-bromo-2-chlorethylene with 18% ethanol which boils at 65° C. (727 mm. Hg column). In order to separate 1 mol ethanol 1.49 mol of trans-1-bromo-2-chlorethylene are circulated. During the phase separation of the azeotropic trans-1-bromo-2-chlorethylene-ethanol mixture one obtains a total of 451.5 g. of aqueous 34.2% ethanol which is 154.2 g. of 100% ethanol or 99.7% of the filling. Distilling of the bubble residue, after a first run of trans-1-bromo-2-chlorethylene-trichlorethane, results in pure ethanol-free ethyl acetate.

Example 11

This example employs a hydrocarbon halide which is aliphatic and unsaturated, contains 1–4 C atoms and the same halogen atoms in cis-position on various C atoms. The compound here is cis-1-2-dichlorethylene.

The bubble filling consists of 500 g. of an azeotropic ethyl acetate-ethanol mixture with 155 g. (3.4 mol) ethanol and 345 g. (3.9 mol) ethyl acetate. As distilling agent one uses cis-1.2-dichlorethylene which is rotated as described in Example 1. Through the head of the column one obtains an azeotropic mixture of ethanol and cis-1.2-dichlorethylene with 9.7% ethanol which boils at 56.5° C. (727 mm. Hg column). In order to separate 1 mol ethanol 4.41 mol of cis-1.2-dichlorethylene are circulated. During the phase separation of the azeotropic cis-1.2-dichloroethylene-ethanol mixture one obtains a total of 451.5 g. of aqueous 34.2% ethanol which is 154.2 g. of 100% ethanol or 99.7% of the filling. Distilling of the bubble residue, after a first run of cis-1.2-dichlorethylene results in pure ethanol-free ethyl acetate.

The invention claimed is:

1. Process for separating a first azeotropic mixture of formed esters of aliphatic carboxylic acids and alcohols corresponding to the alcohol component of said esters, which comprises adding to said first mixture of such an ester and alcohol a hydrocarbon halide which forms with said alcohol a second azeotropic mixture having a boiling point which is at least 5° C. and not more than 40° C. below the boiling point of the first azeotropic ester-alcohol mixture, removing the resulting second azeotropic hydrocarbon halide-alcohol mixture from said ester by distillation and condensation, and adding water to said condensed azeotropic hydrocarbon halide-alcohol mixture to separate said last-mentioned mixture into an aqueous alcohol phase and a hydrocarbon halide phase, said process being characterized by the fact that said hydrocarbon halide is added during a chemical reaction from the group consisting of transesterification and hydrolysis in which said first azeotropic ester-alcohol mixture is created, and by the fact that the said separated hydrocarbon halide is circulated and mixed with a starting ester-alcohol mixture of an ester and an alcohol which is different from those in said first azeotropic mixture in a quantity theoretically necessary to continue forming the aforesaid azeotropic hydrocarbon halide-alcohol mixture.

2. Process according to claim 1, characterized by the fact that during said chemical reaction the compounds which are used for said chemical reaction, are added in equimolar quantities.

3. Process for separating azeotropic mixtures from esters of aliphatic carboxylic acids and alcohols corresponding to the alcohol component of said esters, which comprises adding to a mixture of such an ester and alcohol a hydrocarbon halide which forms with said alcohol an azeotropic mixture having a boiling point which is at least 5° C. and not more than 40° C. below the holding point of the azeotropic ester-alcohol mixture, removing the resulting azeotropic hydrocarbon halide-alcohol mixture from said ester by distillation, and adding water to said azeotropic hydrocarbon halide-alcohol mixture to separate said last-mentioned mixture into an aqueous alcohol phase and a hydrocarbon halide phase, said process being characterized by the fact that the hydrocarbon halide thus separated is circulated and mixed with a starting ester-alcohol mixture in a quantity theoretically necessary to continue forming the aforesaid azeotropic hydrocarbon halide-alcohol mixture.

4. Process according to claim 1, characterized by the fact that the hydrocarbon halide used therein is an aliphatic saturated one with 1–4 carbon atoms, which carries at least 1 halogen atom on at least 1 carbon atom.

5. Process according to claim 1, characterized by the fact that the hydrocarbon halide used therein is an aliphatic unsaturated one with 1–4 carbon atoms, which carries at least 1 halogen atom on at least 1 carbon atom.

6. Process according to claim 1, characterized by the fact that the hydrocarbon halide used therein is an aliphatic unsaturated one with 1–4 carbon atoms and which carries halogen atoms on several different carbon atoms in cis position.

7. Process according to claim 1, characterized by the fact that the hydrocarbon halide used therein is an aliphatic unsaturated one with 1–4 carbon atoms and which carries halogen atoms on several different carbon atoms in trans position.

8. Process according to claim 1, characterized by the fact that the hydrocarbon used is an aliphatic saturated one with 1–4 carbon atoms which carries more than 1 halogen atom on at least one carbon atom, the halogen atoms being the same.

9. Process according to claim 1, characterized by the fact that the hydrocarbon halide used is an aliphatic saturated one with 1–4 carbon atoms which carries more than one halogen atom on at least one carbon atom, the halogen atoms being different.

References Cited

UNITED STATES PATENTS

| 1,984,725 | 12/1934 | Britton et al. | 260—640 |
| 2,010,426 | 8/1935 | Burke | 203—67 |
| 2,865,955 | 12/1958 | Ascherl et al. | 260—499 |
| 3,328,267 | 6/1967 | Muller | 203—44 |

FOREIGN PATENTS 822,607  10/1959  Great Britain.

OTHER REFERENCES

Horsley: Azeotropic Data, American Chemical Soc., Washington, D.C., 1952, pp. 28, 29, 36, 37.

Weissberger: Techniques of Organic Chemistry, vol. IV, Distillation Interscience Publ., Inc., New York, 1951, pp. 364–369 relied upon.

WILBUR L. BASCOMB, Jr., Primary Examiner

U.S. Cl. X.R.

203—44, 67, 98; 260—541, 643